United States Patent [19]

Toral et al.

[11] Patent Number: 4,869,440
[45] Date of Patent: Sep. 26, 1989

[54] MAGNETIC TAPE CASSETTE

[75] Inventors: José Toral, Munich; Gottfried Lutz, Seefeld, both of Fed. Rep. of Germany

[73] Assignee: Agfa-Gevaert Aktiengessellschaft, Leverkusen, Fed. Rep. of Germany

[21] Appl. No.: 175,524

[22] Filed: Mar. 31, 1988

[30] Foreign Application Priority Data

Apr. 10, 1987 [DE] Fed. Rep. of Germany ... 8705330[U]

[51] Int. Cl.4 ............. G11B 23/113; F16B 15/08
[52] U.S. Cl. ....................... 242/199; 411/452;
411/455; 411/501; 411/510; 220/4 B
[58] Field of Search .................. 242/197–199;
360/132; 206/389; 220/4 B, 4 E, 32 N;
411/501, 506, 509, 510, 452, 455

[56] References Cited

U.S. PATENT DOCUMENTS

| 340,692 | 4/1886 | Bailey | 411/452 |
| 2,780,128 | 2/1957 | Rapata | 411/510 |
| 4,097,168 | 6/1978 | Pagel | 411/452 X |
| 4,285,265 | 8/1981 | Rieper | 411/501 |
| 4,349,166 | 9/1982 | Tanaka et al. | 206/389 X |
| 4,453,634 | 6/1984 | Blumenthal | 220/4 B X |
| 4,566,653 | 1/1986 | Bettinger et al. | 220/4 B X |

FOREIGN PATENT DOCUMENTS

| 2924453 | 1/1981 | Fed. Rep. of Germany . |
| 3305899 | 8/1984 | Fed. Rep. of Germany . |
| 2540276 | 9/1983 | France . |

Primary Examiner—David Werner
Attorney, Agent, or Firm—Connolly & Hutz

[57] ABSTRACT

The upper and lower cassette parts of a magnetic tape cassette are connected to each other by means of non-releasable fixtures, wherein a synthetic material bolt is introduced into at least one of the holes provided for screw connections according to the prior art. The bolt is provided with longitudinal ribs (8) or with an inner bore (9) or possesses a thread-like or saw tooth-like track (11) in the manner of a dowel (FIGS. 3a–3c).

2 Claims, 1 Drawing Sheet

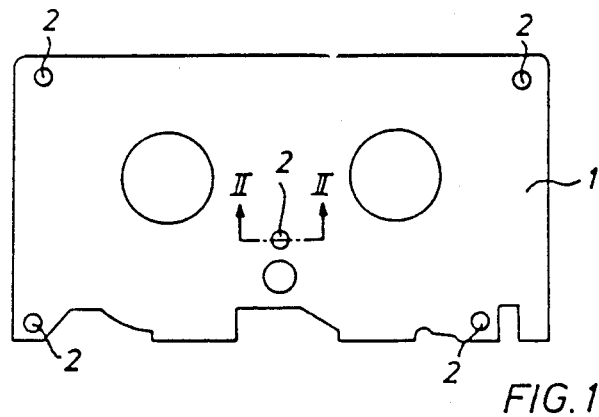
FIG. 1
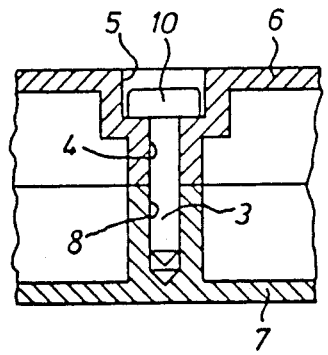
FIG. 2
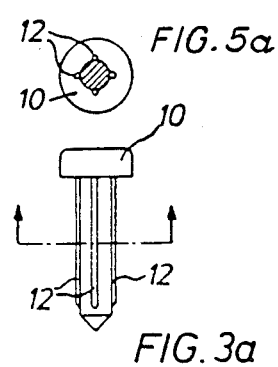
FIG. 5a  FIG. 5b  FIG. 5c
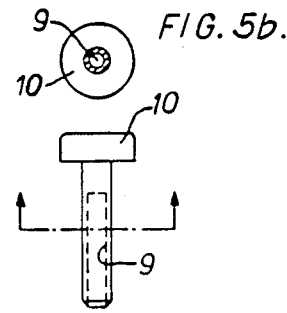
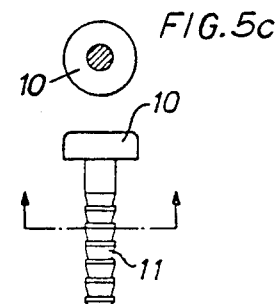
FIG. 3a  FIG. 3b  FIG. 3c
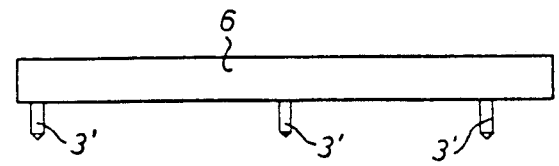
FIG. 4

MAGNETIC TAPE CASSETTE

The invention relates to cassettes, which contain wound tape like magnetic recording carriers and whose upper and lower cassette parts are connected to each other in a manner that is no longer releasable.

The known magnetic tape cassettes consist substantially of two halves, namely the upper and the lower part, wherein the upper part may be firmly connected to the lower part by means of screws. These cassettes have the disadvantage that they may be simply opened with the help of a screw driver and the pre-recorded magnetic tape contained therein may be taken out. There is therefore a need for pre-recorded magnetic tape cassettes, which may not be simply opened and in which there is not the possibility of taking out the original tape and exchanging it with a copy, which is generally of poor quality than the original. The need for such magnetic tape cassettes exists in particular for enterprises which loan video cassettes with pre-recorded tapes.

Although a process for manufacturing copy-proof pre-recorded video cassettes is known among others from DE-OS No. 29 24 453, this process can of course not prevent the exchange of original and dupe in cassettes which may be opened. From FR No. 2 540 276 it is known how to seal the holes containing the screw connections by a plug, which is soldered to the cassette material by means of ultrasound. This device requires an additional fabrication step and therefore makes the cassette manufacture more expensive. Video cassettes are known from DE-GM No. 83 04 710, whose parts are secured by means of breaking screws or non-releasable screws, which may be screwed in but may then no longer be screwed out. The applicant herself, however, indicates that the connections may be released by means of special tools. Furthermore, in this patent utility model rivets or snap-connectors are suggested for the connection of upper and lower parts, which, however, condition a different cassette construction and thus an increase in the expense of finishing.

Therefore, there existed the object of creating a simple and secure connection of the parts of cassette for magnetic recording carriers which necessitates no change in the cassette parts and is in addition easy to manufacture.

In the following, the invention is explained with reference to the drawings in which:

FIG. 1 shows a top view of a cassette according to the innovation

FIG. 2 shows a cross-section through a cassette housing with the connection according to the innovation.

FIGS. 3a-c shows various embodiments of plugs according to the innovation in top view and in cross-section FIG. 4 shows a cassette upper part with a different embodiment according to the invention.

FIGS. 5a, 5b and 5c are cross section of FIGS. 3a-c respectively taken on lines 5a—5a, 5b—5b, and 5c—5c respectively in the direction of the arrows.

FIG. 1 shows in top view a cassette (1) with screw holes (2), of which, according to the innovation, a bolt (3) is inserted in at least one screw hole, while the remaining screw holes may contain customary screws. As FIG. 2 shows, the bolt (3) is driven or pressed in to the recess (4) in the cassette upper part (6) in such a manner that it penetrates in to the recess (8) provided in the cassette lower part (7) and in this manner connects both cassette parts together. As no bore is present in the bolt head (10), which may be arched or flat, the connection is practically unreleasable. The recess (5) in the cassette upper part may be covered by means of a plug, so that the bolt connection is not outwardly recognizable. The bolt may consist of the same synthetic material as the cassette parts.

FIGS. 3a, 3b and 3c; and FIGS. 5a, 5b and 5c represent by way of example various embodiments of bolts according to the innovation, and in order to guarantee the unreleasable connection of cassette lower and upper parts are provided.

(a) with one or several longitudinally running ribs (12)
(b) An inner longitudinal bore (9)
(c) With a thread like or sawtooth-like course (11) in the manner of a dowel Another possible embodiment would be a so-called grooved pin, which possesses longitudinal notches on its exterior side.

As, by contrast with the embodiments known until now, practically no change of the parts is required, the connection is unreleasable, the bolt is cheaply manufacturable, and its introduction may be made even simpler than the screwing of the cassette parts otherwise customary, a simple and well-functioning solution was found with the cassette according to the innovation of preventing the removal of the original tape from the magnetic tape cassette without damaging the latter. The solution described is, in addition, applicable to all known cassette types, such as for example audio, video or DAT.

In FIG. 4, a further embodiment according to the invention is represented. There, cassette upper part possesses on its lower side one or several injected pins (3'), which may have the shape represented in FIG. 3 and which are arranged so that they may be pressed into the screw holes provided in the cassette lower part. In the process screw holes and screw dummies may be present as dummies in the upper side of the cassette upper part (not drawn).

We claim:

1. A magnetic tape cassette comprising at least one magnetic tape roll within a two part housing consisting of a cover part fitted with several holes and a bottom part fitted with several corresponding recesses for receiving connecting means introduced into the holes in a manner no longer releasable characterised in that the connecting means is a synthetic bolt (3) fitted with a bolt head (10) which has no bore and wherein the bolt consists of the same material as the cover part (6) or bottom part (7) of the cassette and wherein said bolt has an outer circumference and longitudinal ribs are formed on the said outer circumference.

2. A magnetic tape cassette comprising at least one magnetic tape roll within a two part housing consisting of a cover part fitted with several holes and a bottom part fitted with several corresponding recesses for receiving connecting means introduced into the holes in a manner no longer releasable characterised in that the connecting means is a synthetic bolt (3) fitted with a bolt head (10) which has no bore and wherein the bolt consists of the same material as the cover part (6) or bottom part (7) of the cassette and wherein said bolt has a shank and an internal bore is formed within said shank.

* * * * *